(12) United States Patent
Kim

(10) Patent No.: US 10,385,909 B2
(45) Date of Patent: Aug. 20, 2019

(54) BOLT STRUCTURE HAVING LOCKING UNIT EMBEDDED THEREIN

(71) Applicant: Core Bolt Co., Ltd., Gwangju (KR)

(72) Inventor: Young Kwon Kim, Haenam (KR)

(73) Assignee: CORE BOLT CO., LTD., Gwangju (KR)

( * ) Notice: Subject to any disclaimer, the term of this patent is extended or adjusted under 35 U.S.C. 154(b) by 121 days.

(21) Appl. No.: 15/660,869

(22) Filed: Jul. 26, 2017

(65) Prior Publication Data
US 2019/0032698 A1 Jan. 31, 2019

(51) Int. Cl.
*F16B 39/04* (2006.01)
*F16B 39/02* (2006.01)
*F16B 35/04* (2006.01)

(52) U.S. Cl.
CPC ............ *F16B 39/028* (2013.01); *F16B 39/04* (2013.01); *F16B 35/041* (2013.01)

(58) Field of Classification Search
CPC ............................ F16B 39/04; F16B 39/028
USPC .......... 411/271, 325, 199, 200, 315, 21, 940
See application file for complete search history.

(56) References Cited

U.S. PATENT DOCUMENTS

| | | | | | |
|---|---|---|---|---|---|
| 1,409,817 | A | * | 3/1922 | Bilterman | F16B 39/023 411/259 |
| 1,433,410 | A | * | 10/1922 | Passauer | F16B 39/04 411/207 |
| 2,685,877 | A | * | 8/1954 | Dobelle | A61F 2/3603 411/21 |
| 3,390,712 | A | * | 7/1968 | McKay | F16B 39/04 24/453 |
| 3,534,650 | A | * | 10/1970 | Kubokawa | F16B 19/109 24/453 |
| 4,636,121 | A | * | 1/1987 | Miller | F16B 39/04 411/140 |
| 4,681,495 | A | * | 7/1987 | Crespin | F16B 21/165 411/21 |
| 5,931,621 | A | * | 8/1999 | Griffith | F16B 39/02 411/255 |

* cited by examiner

*Primary Examiner* — Flemming Saether
(74) *Attorney, Agent, or Firm* — Patent Office of Chung Park

(57) ABSTRACT

The present invention relates to a bolt structure including: a base bolt having one side end portion inserted into holes formed at the time when a fixed structure and an object to be fixed are laid on top of each other; a core bolt adapted to be advanceably and retreatably screw-coupled to the base bolt; a nut fastened to the end portion of the base bolt protruding from the holes to maintain the state where the fixed structure and the object to be fixed are laid on top of each other; locking units adapted to selectively pressurize the external surface of the nut to prevent the escape of the base bolt; and a restraint unit adapted to be advanceably and retreatably screw-coupled to the base bolt and come into contact with the end portion of the core bolt to restrain the advancement and retreat of the core bolt.

8 Claims, 11 Drawing Sheets

BOLT STRUCTURE HAVING LOCKING UNIT EMBEDDED THEREIN

BACKGROUND OF THE INVENTION

Field of the Invention

The present invention relates to fixing means (a bolt and a nut), and more particularly, to a bolt structure that is configured wherein locking units are extendably changed in shape or position by means of tightening of a core bolt passing through a base bolt in such a manner as to have physical properties and structures capable of pressurizing a portion to be fixed, thereby preventing a nut from being loosened from a structure accompanying vibrations and pressures and wherein a counter locking unit is provided to restrain the locking units, thereby effectively achieving loosening prevention and theft prevention.

Background of the Related Art

Generally, a bolt including a screw as a kind of fixing means has a head and a screw portion (a body formed of a screw thread) and is thus inserted into a through hole and fastened to a nut so as to couple a plurality of parts or to couple a structure to an object to be fixed to the structure.

Bolt fastening generates a bi-directional torque because the head of the bolt and the nut pressurize the object to be fixed bi-directionally, so that the bolt and the nut cannot be physically escaped from each other. However, friction is generated from one surface around the shaft of the screw thread of the bolt, and a gap is generated from the other surface. Under such principle, the nut becomes loosened by vibrations.

Recently, various spring washers, which improve a resistance value of a nut loosening torque upon the generation of vibrations, have been introduced, but the nut loosening may still occur under the vibrations generated continuously.

For example, in case of a bridge (a suspension bridge, a cable-stayed bridge, an arch bridge, a Rahmen bridge, a truss bridge, and so on) as a structure accompanying ambient vibrations and a pier structure (elevated railroads, roads, and so on) accompanying vibrations through the activity thereof, the structure itself is bolt-coupled or a variety of service facilities attached to the structure are bolt-fastened, so that the bolts may be loosened due to the continuously generated vibrations, which undesirably causes a high maintenance cost every year.

Further, a chemical plant or nuclear reactor is exposed to serious safety accidents, and accordingly, a high maintenance cost for preventing nut loosening from a pressure pipe flange is generated every year.

FIG. 1 is a sectional view showing the fastened state between a bolt and a nut in a conventional practice.

In more detail, as shown in FIG. 1, friction is generated from one surface around the shaft of the screw thread of a bolt to which a nut is fastened, and a gap is generated from the other surface. Such gap is necessarily required to fasten and unfasten the nut, but causes the nut to be loosened upon the application of continuous vibrations.

In case of undeveloped countries, moreover, theft accidents of road facilities frequently happen, and since the fastening between the bolt and the nut is very intuitive, the fastening may be released only by means of a wrench as a simple tool. For example, road signs as the road facilities are very expensive materials made of alloys and thus sold and purchased easily, and accordingly, the theft accidents often occur in the undeveloped countries.

If a theft prevention device is provided on one bolt and nut structure among a plurality of bolt fastening structures, theft willingness becomes lost. In addition to general bolt structures, for example, one specific bolt is installed on high expensive vehicle wheel and tire, thereby providing excellent theft prevention effects.

SUMMARY OF THE INVENTION

Accordingly, the present invention has been made in view of the above-mentioned problems occurring in the prior art, and it is an object of the present invention to provide a bolt structure that is configured wherein locking units are extendably changed in shape or position by means of tightening of a core bolt passing through a base bolt in such a manner as to have physical properties and structures capable of pressurizing a portion to be fixed, thereby preventing a nut from being loosened from a structure accompanying vibrations and pressures and wherein a counter locking unit is provided to restrain the locking units, thereby effectively achieving loosening prevention and theft prevention.

To accomplish the above-mentioned object, according to the present invention, there is provided a bolt structure including: a base bolt having one side end portion inserted into holes formed at the time when a fixed structure and an object to be fixed are laid on top of each other; a core bolt adapted to pass through the center of the base bolt in a longitudinal direction of the base bolt in such a manner as to be advanceably and retreatably screw-coupled to the base bolt; a nut fastened to the end portion of the base bolt protruding from the holes to maintain the state where the fixed structure and the object to be fixed are laid on top of each other; locking units adapted to selectively pressurize the external surface of the nut according to the advancement and retreat of the core bolt to prevent the escape of the base bolt; and a restraint unit adapted to pass through the center of the base bolt in the longitudinal direction of the base bolt at the opposite side to the core bolt in such a manner as to be advanceably and retreatably screw-coupled to the base bolt and come into contact with the end portion of the core bolt to restrain the advancement and retreat of the core bolt.

According to the present invention, desirably, the base bolt includes a screw through hole formed along the center thereof in the longitudinal direction thereof in such a manner as to have a screw thread formed along the inner peripheral surface thereof and an external screw thread formed on the outer peripheral surface thereof in the same direction as or reverse direction to the screw thread of the screw through hole, and the base bolt has a polygonal head portion.

According to the present invention, desirably, the base bolt comprises an accommodation groove formed concavedly on the head portion thereof to accommodate the end portion of the restraint unit thereinto.

According to the present invention, desirably, the core bolt includes: a screw portion fastened correspondingly to the screw through hole formed at the center of the base bolt; a head portion formed on one side of the screw portion; and a driver groove formed on the other side end of the screw portion.

According to the present invention, desirably, the diameter of the head portion is smaller than the outer diameter of the base bolt, so that in the state where the core bolt is fastened to the base bolt, the nut is fastened to the base bolt.

According to the present invention, desirably, the base bolt includes a plurality of extended induction paths formed in a radial direction inside the end portion thereof in such a manner as to be extendable outwardly, and the locking units have shapes of pins inserted into the extended induction paths formed on the base bolt so that the locking units are pushed by the movement of the core bolt and protrude outwardly from the base bolt to apply pressurizing forces to the nut.

According to the present invention, desirably, the restraint unit includes: a counter locking member inserted into the center of the base bolt in such a manner as to have the end portion coming into contact with the end portion of the core bolt; a flange fastened to the center of the base bolt in such a manner as to be accommodated into the accommodation groove; and an elastic spring disposed between the counter locking member and the flange to apply elasticity to the counter locking member.

According to the present invention, desirably, the counter locking member includes: a protruding member protruding from one end portion thereof in such a manner as to come into contact with the end portion of the core bolt and to be inserted into the driver groove formed on the end portion of the core bolt; and a polygonal member having a polygonal longitudinal section formed on the other end portion thereof in such a manner as to be inserted into a polygonal through hole formed on the center of the flange.

According to the present invention, desirably, the polygonal member includes a fastening hole penetrated into the center of the interior thereof, the fastening hole having a screw thread formed along the inner peripheral surface thereof, and the flange is fastened to the base bolt by means of a fastening tool, the fastening tool including: a fastening protrusion having a screw thread formed on the outer peripheral surface thereof in such a manner as to be fastened to the fastening hole of the polygonal member; and an accommodation member slidingly movable and having an accommodation hole formed therein to accommodate the polygonal member thereinto.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
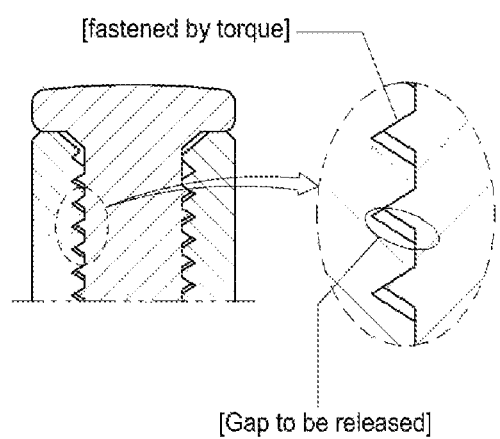
FIG. 1 is a sectional view showing the fastened state between a bolt and a nut in a conventional practice.

Hereinafter, an explanation on a bolt structure having locking units embedded therein according to the present invention will be given with reference to the attached drawings, and in the description, it should be noted that the parts corresponding to those of the drawings are indicated by corresponding reference numerals.

In the description or claims, when it is said that one portion is described as "includes" any component, one element further may include other components unless no specific description is suggested.

Figure 2:
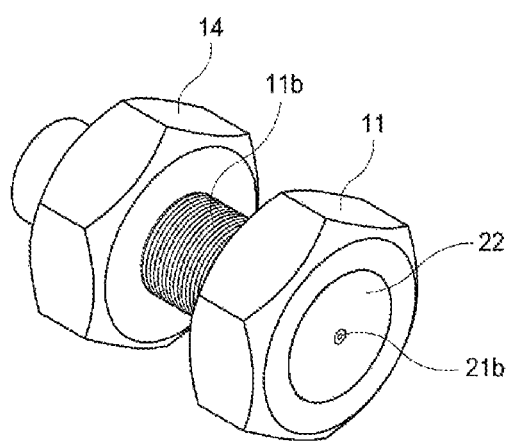
FIG. 2 is a perspective view showing the front side of a bolt structure having locking units embedded therein according to the present invention.
Figure 3:
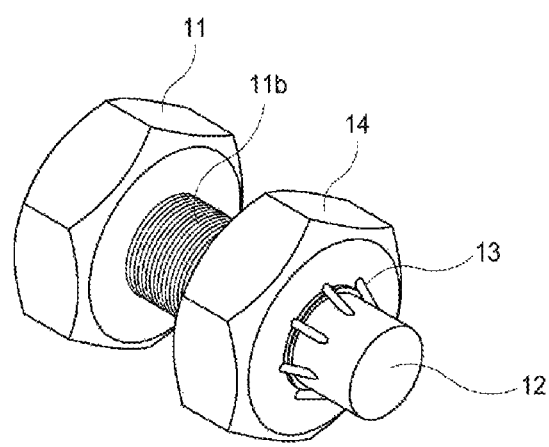
FIG. 3 is a perspective view showing the rear side of the bolt structure according to the present invention.
Figure 4:
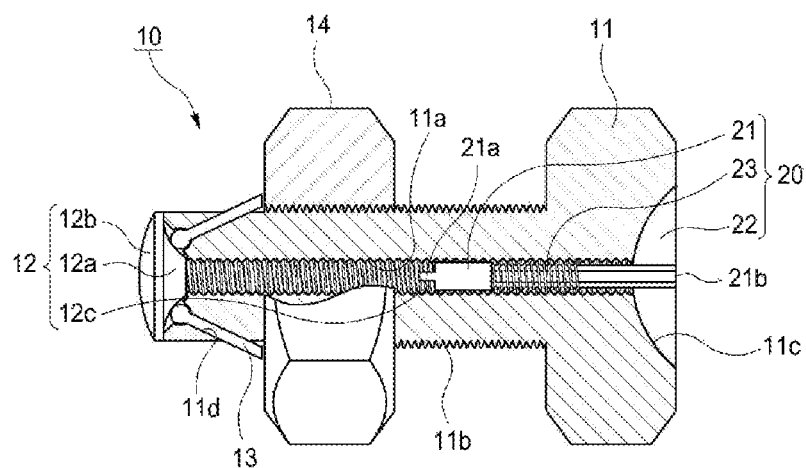
FIG. 4 is a longitudinal sectional view showing the bolt structure according to the present invention.
Figure 5:
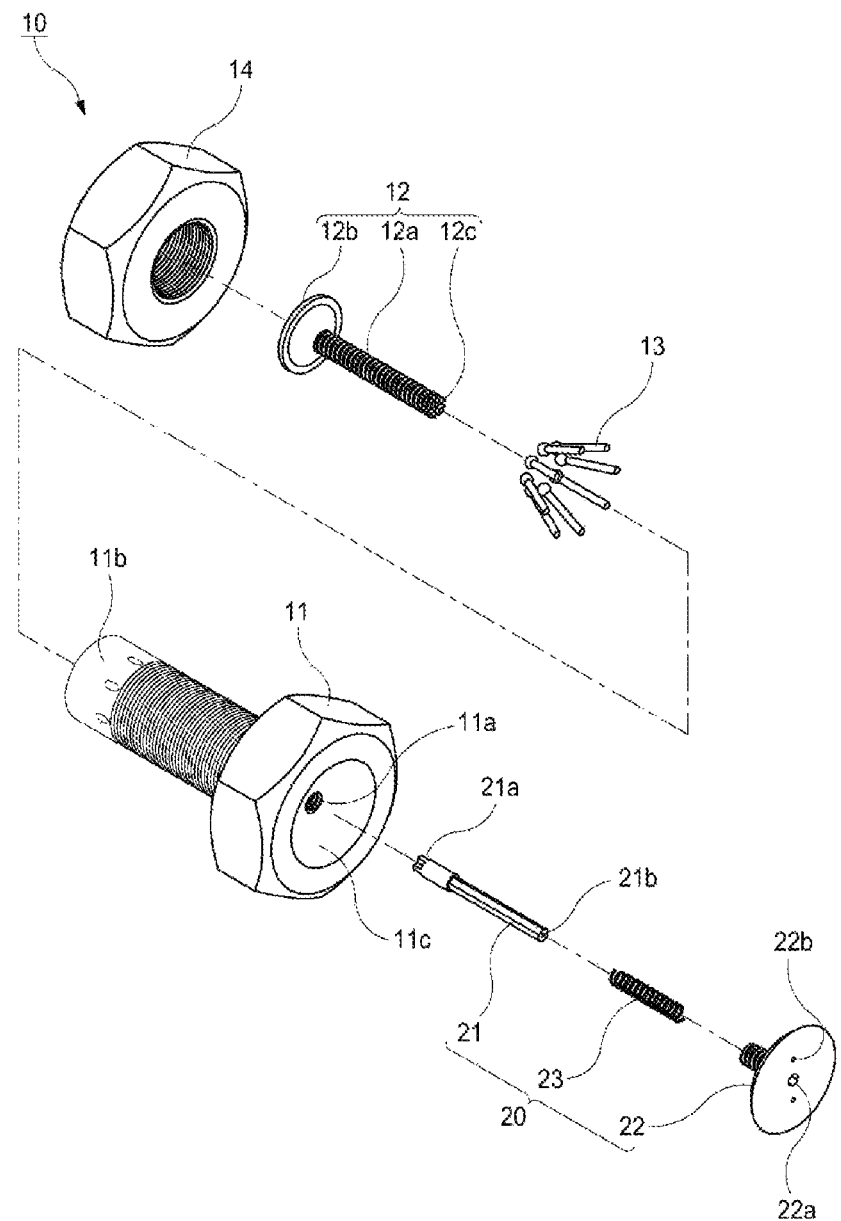
FIG. 5 is an exploded perspective view showing the bolt structure according to the present invention.
Figure 6:
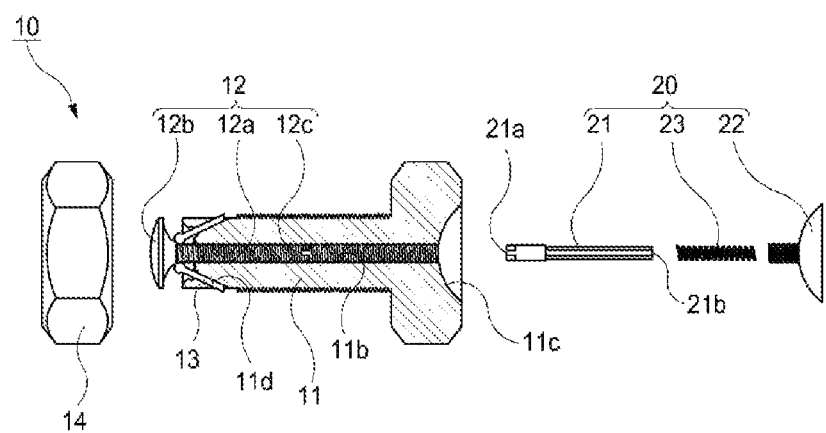
FIG. 6 is an exploded perspective view showing the longitudinal section of the bolt structure according to the present invention.
Figure 7A:
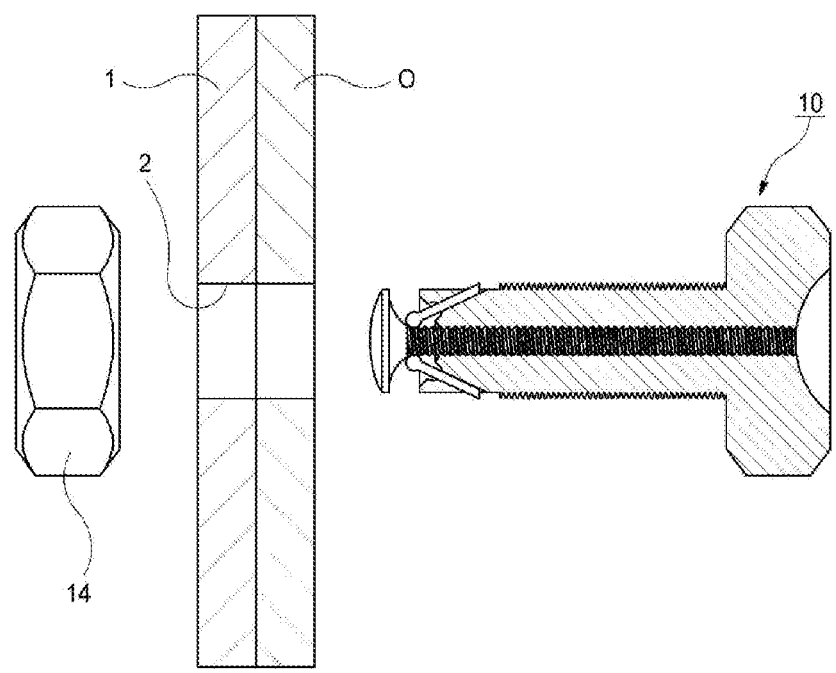
FIGS. 7a to 7d are sectional views showing the sequential assembling processes of the bolt structure according to the present invention.
Figure 7B:
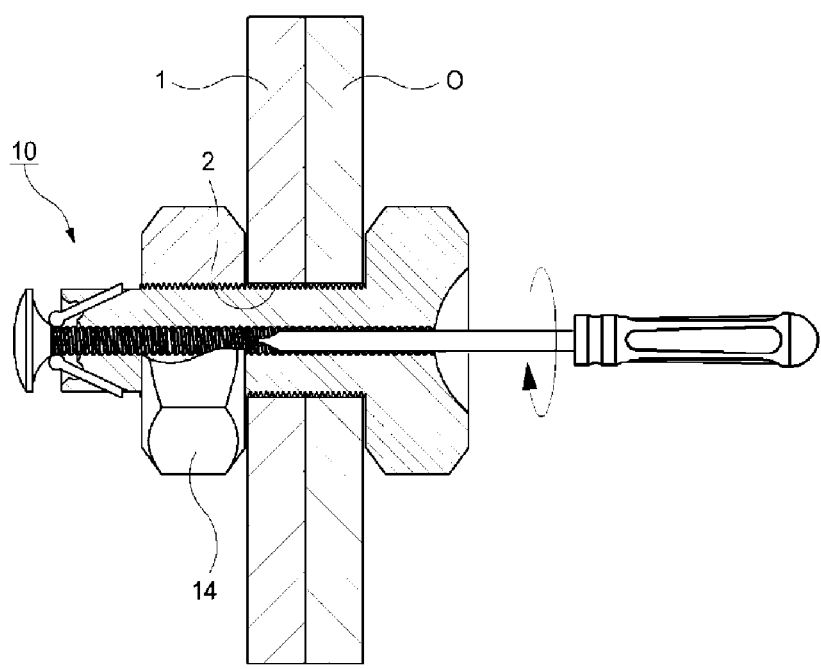
Figure 7C:
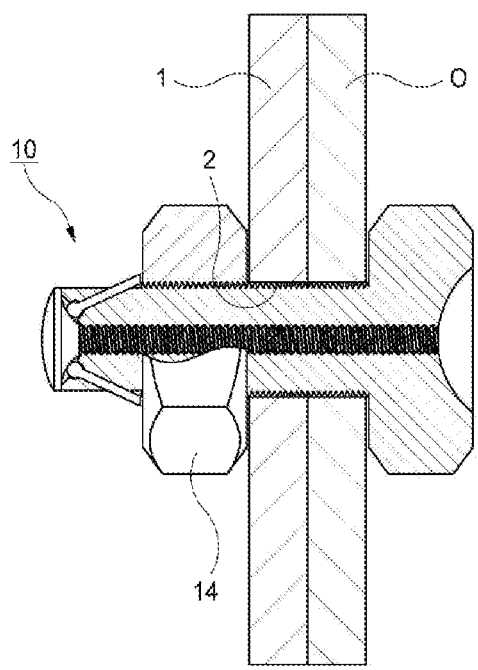
Figure 7D:
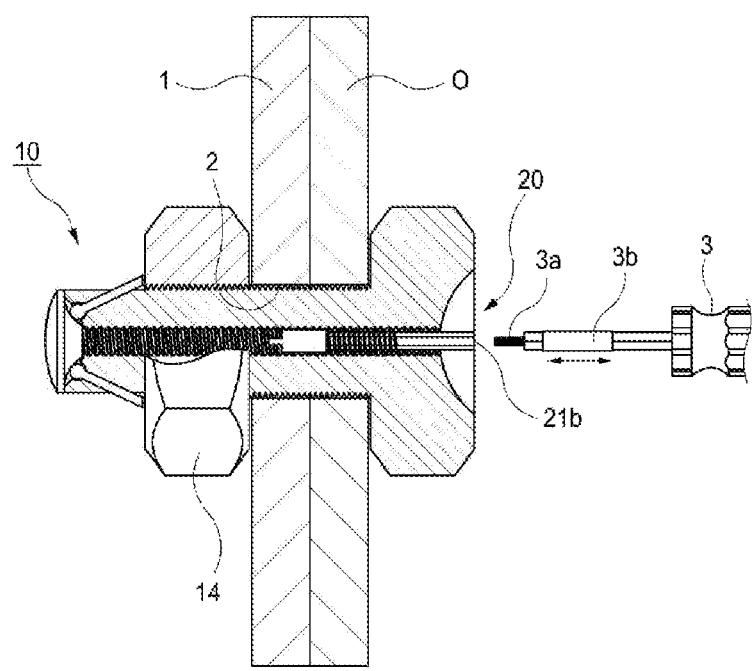
Figure 8:
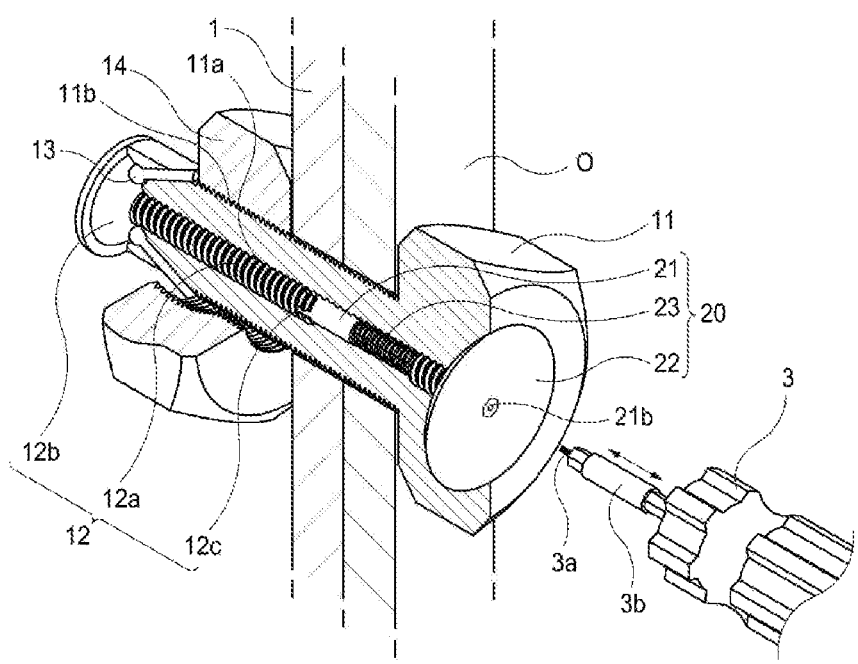
FIG. 8 is a cut-away perspective view showing the bolt structure according to the present invention.

FIG. 2 is a perspective view showing the front side of a bolt structure having locking units embedded therein according to the present invention, FIG. 3 is a perspective view showing the rear side of the bolt structure according to the present invention, FIG. 4 is a longitudinal sectional view showing the bolt structure according to the present invention, FIG. 5 is an exploded perspective view showing the bolt structure according to the present invention, FIG. 6 is an exploded perspective view showing the longitudinal section of the bolt structure according to the present invention, FIGS. 7a to 7d are sectional views showing the sequential assembling processes of the bolt structure according to the present invention, and FIG. 8 is a cut-away perspective view showing the bolt structure according to the present invention.

The present invention will now be described in detail with reference to the attached drawings.

As shown in FIGS. 2 to 8, a bolt structure according to the present invention includes: a base bolt 11 having one side end portion inserted into holes 2 formed at the time when a fixed structure 1 and an object O to be fixed are laid on top of each other; a core bolt 12 adapted to pass through the center of the base bolt 11 in a longitudinal direction of the base bolt 11 in such a manner as to be advanceably and retreatably screw-coupled to the base bolt 11; a nut 14 fastened to the end portion of the base bolt 11 protruding from the holes to maintain the state where the fixed structure 1 and the object O to be fixed are laid on top of each other; locking units 13 adapted to selectively pressurize the external surface of the nut 14 according to the advancement and retreat of the core bolt 12 to prevent the escape of the base bolt 11; and a restraint unit 20 adapted to pass through the center of the base bolt 11 in the longitudinal direction of the base bolt 11 at the opposite side to the core bolt 12 in such a manner as to be advanceably and retreatably screw-coupled to the base bolt 11 and come into contact with the end portion of the core bolt 12 to restrain the advancement and retreat of the core bolt 12.

First, the nut 14 fastened to the base bolt 11 may be removed from the parts of the present invention, but through the torque generated from the nut 14, the nut 14 pulls the inserted portion of the base bolt 11 into the hole 2 of the fixed structure 1, thereby providing a larger fixing force or fixing the object O to be fixed.

Now, an explanation on the bolt structure 10 according to the present invention will be in detail given. First, the base bolt 11 is a block body having a screw through hole 11a formed along the center thereof in the longitudinal direction thereof in such a manner as to have a screw thread formed along the inner peripheral surface thereof and an external screw thread 11b formed on the outer peripheral surface thereof in the same direction as or reverse direction to the screw thread of the screw through hole 11a. In this case, the base bolt 11 has a shape of a headless bolt or a polygonal bolt, or has saw-shaped protrusions formed along the longitudinal direction thereof.

At this time, the external screw thread 11b is formed on the entire outer periphery of the base bolt 11, but may be formed just on a portion of the outer periphery of the base bolt 11 to which the nut 14 or the object O to be fixed is coupled.

Further, the base bolt 11 has an accommodation groove 11c formed on the head portion thereof to accommodate the end portion of the restraint unit 20 thereinto, so that the plate surface of the end portion of the base bolt 11 is desirably aligned with the plate surface of the end portion of the restraint unit 20, thereby preventing the restraint unit 20 from being easily separated from the base bolt 11.

When the restraint unit 20 is completely disposed on the base bolt 11, that is, it is completely accommodated into the accommodation groove 11c of the base bolt 11, without having any outwardly protruding portion therefrom, so that it is impossible to separate the restraint unit 20 from the base bolt by holding a portion of the restraint unit 20 protruding outwardly from the base bolt 11 by means of a tool like pliers or tongs.

Further, the base bolt 11 has a plurality of extended induction paths 11d formed in a radial direction inside the end portion thereof in such a manner as to be extendable outwardly.

The extended induction paths 11d serve to insertedly accommodate the locking units 13 thereinto, and that is, they serve to selectively insert and draw the locking units 13 into and from the interior and exterior of the base bolt 11 according to the advancement and retreat of the core bolt 12.

The core bolt 12 includes a screw portion 12a fastened correspondingly to the screw through hole 11a formed at the center of the base bolt 11, a head portion 12b formed on one side of the screw portion 12a, and a driver groove 12c formed on the other side end of the screw portion 12a.

The head portion 12b has a circular block body having a semispherical or wedge-shaped front end. Otherwise, the front end of the head portion 12b may be flat.

Further, the diameter of the head portion 12b is smaller than the outer diameter of the base bolt 11, so that in the state where the core bolt 12 is fastened to the base bolt 11, the nut 14 can be desirably fastened to the base bolt 11.

The driver groove 12c has a shape of a straight line, cross, or the like, and the tensile strength of the core bolt 12 is equal to or higher than that of a general bolt or high tension bolt.

Moreover, desirably, the base bolt 11 is relatively softer than the core bolt 12, but of course, the base 11 and the core bolt 12 may have the same stiffness as each other. The base bolt 11 and the core bolt 12 are made of iron as a main material, but of course, they may be made of an aluminum, stainless, or plastic material.

Desirably, the above-mentioned tensile strength, the degree of the strength, and the materials of the base bolt 11 and the core bolt 12 are selectively designed and applied in accordance with the fields of the application of the bolt structure according to the present invention, the life terms thereof, and the necessities thereof.

The locking units 13 are made of a synthetic resin material, a metal material, or a combination of the two.

The locking units 13 have shapes of pins inserted into the extended induction paths 11d formed on the base bolt 11 so that they are pushed by the movement of the core bolt 12 and protrude outwardly from the base bolt 11 to apply pressurizing forces to the nut 14.

On the other hand, the restraint unit 20 is adapted to pass through the center of the base bolt 11 in the longitudinal direction of the base bolt 11 at the opposite side to the core bolt 12 in such a manner as to be advanceably and retreatably screw-coupled to the base bolt 11 and come into contact with the end portion of the core bolt 12 to restrain the advancement and retreat of the core bolt 12, so that the locking units 13 protrude outwardly from the base bolt 11 to apply the pressurizing forces to the nut 14.

The restraint unit 20 includes a counter locking member 21 inserted into the center of the base bolt 11 in such a manner as to have the end portion coming into contact with the end portion of the core bolt 12, a flange 22 fastened to the center of the base bolt 11 in such a manner as to be accommodated into the accommodation groove 11c, and an elastic spring 23 disposed between the counter locking member 21 and the flange 22 to apply elasticity to the counter locking member 21.

The counter locking member 21 has a protruding member 21a protruding from one end portion thereof in such a manner as to come into contact with the end portion of the core bolt 12 and to be inserted into the driver groove 12c formed on the end portion of the core bolt 12 and a polygonal member 21b having a polygonal longitudinal section formed on the other end portion thereof in such a manner as to be inserted into a polygonal through hole 22a formed on the center of the flange 22.

The protruding member 21a has the corresponding shape to the driver groove 12c in such a manner as to be engagedly inserted into the driver groove 12c. If the driver groove 12c is a straight line-shaped groove, the protruding member 21a protrudes to the shape of a straight line, and if the driver groove 12c is a cross-shaped groove, the protruding member 21a protrudes to the shape of a cross, so that they are engaged with each other.

The polygonal member 21b has the polygonal longitudinal section, and according to the present invention, the polygonal member 21b has a hexagonal longitudinal section so that it is inserted into the hexagonal through hole 22a.

Further, the polygonal member 21b has a fastening hole having a given length penetrated into the center of the interior thereof, and the fastening hole has a screw thread formed along the inner peripheral surface thereof in such a manner as to be engaged with a fastening protrusion 3a of a fastening tool 3.

The flange 22 is curvedly formed on one side surface thereof in such a manner as to be accommodated into the accommodation groove 11c formed on the base bolt 11 and is flattedly formed on the other side surface opposite to one side surface thereof so that no outwardly protruding area from the base bolt 11 exists when the flange 22 is accommodated into the accommodation groove 11c.

The flange 22 has the through hole 22a formed on the center thereof along the longitudinal direction thereof in such a manner as to allow the polygonal member 21b formed on the counter locking member 21 to pass therethrough and protrude outwardly from the flange 22.

Accordingly, the core bolt 12 and the flange 22 screw-fastened to each other are restrained bi-directionally by means of the counter locking member 21.

Further, the outwardly protruding polygonal member 21b has the fastening hole having the screw thread formed along the inner peripheral surface thereof in such a manner as to be fastened to the fastening protrusion 3a, and the fastening tool 3 adapted to fasten the flange 22 to the base bolt 11 includes the fastening protrusion 3a fastened to the fastening hole of the polygonal member 21b and an accommodation member 3b slidingly movable and having an accommodation hole formed therein to accommodate the polygonal member 21b thereinto to allow the restraint state of the restraint unit 20 to be released.

Accordingly, the restraint state of the restraint unit 20 cannot be arbitrarily released, without having a specific tool like the fastening tool 3 having the fastening protrusion 3a having the screw thread formed on the outer peripheral surface thereof in such a manner as to be fastened to the fastening hole and the accommodation member 3b slidingly movable and having the accommodation hole formed therein to accommodate the polygonal member 21b thereinto.

The elastic spring 23 is disposed between the counter locking member 21 and the flange 22 to apply elasticity to the counter locking member 21, so that the engaged state of the protruding member 21a of the counter locking member 21 with the driver groove 12c of the core bolt 12 can be firmly maintained.

Under the above-mentioned configuration, now, an explanation on the process of fixing the object O to be fixed to the fixed structure 1 by means of the bolt structure according to the present invention will be given with reference to FIGS. 7a to 7d.

As shown in FIG. 7a, first, the fixed structure 1 and the object O to be fixed are laid on each other, and in the state where the holes 2 formed on the fixed structure 1 and the object O to be fixed correspond to each other, the base bolt 11 is inserted into the holes 2.

As shown in FIG. 7b, next, the nut 14 is firmly fastened to the end portion of the base bolt 11 passing through the holes 2 and protruding inwardly from the fixed structure 1, so that the object O to be fixed is fixed to the fixed structure 1.

So as to prevent the nut 14 from being arbitrarily loosened, after that, a driver is inserted into the driver groove 12c of the core bolt 12 and then rotates, so that the screw portion 12a formed on the outer peripheral surface of the core bolt 12 is fastened to the screw through hole 11a of the base bolt 11 and then inserted into the interior of the base bolt 11.

As shown in FIG. 7c, if the insertion of the core bolt 12 is continuously carried out, the head portion 12b of the core bolt 12 pushes the locking units 13 so that the locking units 13 are induced radially (like umbrella ribs) along the extended induction paths 11d and protrude outwardly from the base bolt 11 to pressurize the external surface of the nut 14, thereby preventing the nut 14 from being arbitrarily loosened.

In the state where the base bolt 11 is fitted to the hole 2 of the fixed structure 1, if the driver rotates after inserted into the screw through hole 11a formed on the base bolt 11, the screw portion 12a of the core bolt 12 is inserted into the interior of the base bolt 11 along the screw through hole 11a, and accordingly, the head portion 12b pushes the pin-shaped locking units 13, so that the locking units 13 pressurize the external surface of the nut 14 to prevent the nut 14 from being arbitrarily loosened.

Next, the elastic spring 23 is fitted to the counter locking member 21 of the restraint unit 20, and the polygonal member 21b protrudes from the flange 22. After that, the restraint unit 20 is inserted into the screw through hole 11a of the base bolt 11 in the direction opposite to the core bolt-fastened direction, and the fastening protrusion 3a of the fastening tool 3 is fastened to the fastening hole of the polygonal member 21b. Next, the fastening tool 3 pulls to permit the polygonal member 21b to protrude, and then, the slidingly movable accommodation member 3b of the fastening tool 3 pushes to allow the polygonal member 21b to be accommodated into the accommodation hole formed in the accommodation member 3b. After that, the fastening tool 3 rotates in a clockwise direction to allow the flange 22 to be fastened to the screw through hole 11a, as shown in FIG. 7d.

If the fastening tool 3 is removed after the flange 22 is fastened to the screw through hole 11a, the elastic spring 23 pressurizes the counter locking member 21 to permit the protruding member 21a formed on the end portion of the counter locking member 21 to be engagedly inserted into the driver groove 12c of the core bolt 12.

In this state, as the rotation of the core bolt 12 is restrained, the state where the locking units 13 protrude by means of the head portion 12b of the core bolt 12 and thus pressurize the nut 14 can be rigidly maintained, so that the restraint unit 20 is not arbitrarily released from the restraint state thereof, thereby firmly fixing the object to be fixed O to the fixed structure 1.

Next, a process of disassembling the bolt structure according to the present invention is carried out reversely to the above-mentioned fixing process, and the process will be in detail explained below.

First, the fastening tool 3 rotates in a clockwise direction to permit the fastening protrusion 3a to be fastened to the fastening hole formed on the polygonal member 21b of the counter locking member 21, and if the fastening protrusion 3a is completely fastened, the fastening tool 3 pulls in the opposite direction to the advancing direction thereof when the fastening protrusion 3a is fastened, thereby allowing the protruding member 21a of the counter locking member 21 to be escaped from the driver groove 12c of the core bolt 12.

In the state where the protruding member 21a of the counter locking member 21 is escaped from the driver groove 12c of the core bolt 12, after that, the accommodation member 3b of the fastening tool 3 slidingly moves to allow the polygonal member 21b to be restrainedly accommodated into the accommodation hole thereof, and if the fastening tool 3 rotates in a counterclockwise direction, in this state, the hexagon-shaped polygonal member 21b inserted into the through hole 22a of the flange 22 rotates the flange 22 in the counterclockwise direction to cause the flange 22 to be escaped from the screw through hole 11a.

Through the escape of the flange 22 from the screw through hole 11a, if the protruding member 21a of the counter locking member 21 is completely escaped from the driver groove 12c of the core bolt 12, the core bolt 12 is released so that the pressurizing forces of the locking units 13 toward the nut 14 is removed to allow the nut 14 to be disassembled.

As described above, the bolt structure according to the present invention is configured wherein in the state where the base bolt 11 is inserted into the hole 2 of the fixed structure 1, a tool (driver) is inserted into the through hole 11a having the screw thread formed along the inner peripheral surface of the center of the base bolt 11 and rotates in the state of being fitted to the driver groove 12c formed on the front end of the core bolt 12, so that the core bolt 12 advances outwardly from the fixed structure 1, and in this process, the locking units 13 located between the head portion 12b of the core bolt 12 and one side end of the base bolt 11 apply the pressurizing forces to the nut 14, thereby firmly fixing the bolt structure to the hole 2, without any escape.

In case of the existing bolt and nut, fastening and loosening are intuitive, and accordingly, they can be freely installed or removed only by means of a wrench purchasable from a general market. According to the present invention, however, the removal process of the bolt and nut is very difficult, without having any specially designed tool, and it is impossible to perform the removal process unless the removal method is recognized. For example, theft accidents of road attachments like road signs often happen in undeveloped or developing countries. In this case, if the bolt structure according to the present invention is applied to the road attachments, excellent theft prevention effects can be obtained.

In the conventional practice, the loosening prevention functions of the existing bolt and nut are obtained by optimizing the loosening prevention torque, but according to the present invention, the nut is pressurized by means of the physical structure of the locking units, so that the nut cannot be arbitrarily loosened, without having any specific tool.

The nut may be basically loosened by one surface friction of the screw thread thereof and the allowable gap of the opposite side screw thread thereto upon application of vibrations thereto. Accordingly, the frictional range of the nut is optimized using a spring washer, but the nut may be easily loosened by means of the vibrations continuously applied thereto. That is, the present invention is very effective to a structure accompanying vibrations. In a section where ambient vibrations are generated on piers, bridges, and railroads, the loosening prevention effects can be permanently exerted, and further, the bolt structure can be disassembled, without any destruction, thereby being very effective in the reduction of maintenance cost thereof. On the other hand, nut loosening on the pipes accompanying high pressures like pressure pipes, turbines and so on used in a generation plant causes serious safety accidents. Accordingly, all of bolts should be periodically checked to detect the loosening degrees of the nuts or to perform the maintenance of the nuts. According to the present invention, the bolt structure, as a very useful product, is applied to the high pressure pipes, so that when it is mounted, the nut cannot be arbitrarily loosened by means of the physical structure of the locking units.

Further, if the bolt structure according to the present invention is mounted on a spaceship, it cannot be loosened from the body of the spaceship by the vibrations or impacts generated upon the space flight.

Moreover, if the bolt structure according to the present invention is mounted on a nuclear reactor or chemical plant at which serious safety accidents may happen, the loosening prevention is provided or the bolt loosening caused by an external invader is prevented.

While the present invention has been described with reference to the particular illustrative embodiments, it is not to be restrained by the embodiments but only by the appended claims. It is to be appreciated that those skilled in the art can change or modify the embodiments without departing from the scope and spirit of the present invention.

What is claimed is:

1. A bolt structure comprising:
   a base bolt having one end portion configured to be inserted into holes formed in a fixed structure and an object to be fixed;
   a core bolt adapted to pass through a center of the base bolt in a longitudinal direction of the base bolt in such a manner as to be advanceably and retreatably screw-coupled to the base bolt;
   a nut fastened to the end portion of the base bolt protruding from the holes to maintain a state where the fixed structure and the object to be fixed are laid on top of each other;
   locking units adapted to selectively pressurize an external surface of the nut according to advancement and retreat of the core bolt to prevent an escape of the base bolt; and
   a restraint unit adapted to pass through the center of the base bolt in the longitudinal direction of the base bolt at an opposite side to the core bolt in such a manner as to be advanceably and retreatably screw-coupled to the base bolt and come into contact with an end portion of the core bolt to restrain the advancement and retreat of the core bolt, the restraint unit comprising:
      a counter locking member inserted into the center of the base bolt and having an end portion in contact with the end portion of the core bolt;
      a flange fastened to the center of the base bolt; and
      an elastic spring disposed between the counter locking member and the flange to apply a resilient force to the counter locking member.

2. The bolt structure according to claim 1, wherein the base bolt comprises: an external screw thread formed on an outer peripheral surface thereof in a same direction as or a reverse direction to a screw thread that is formed at the center of the base bolt along the longitudinal direction; and a head portion having a polygonal shape.

3. The bolt structure according to claim 2, wherein the base bolt comprises an accommodation groove formed concavedly on the head portion thereof to accommodate an end portion of the restraint unit thereinto.

4. The bolt structure according to claim 1, wherein the core bolt comprises:
   a screw portion fastened to a screw formed at the center of the base bolt along the longitudinal direction;
   a head portion formed on one side of the screw portion; and
   a driver groove formed on an other side of the screw portion.

5. The bolt structure according to claim 4, wherein a diameter of the head portion of the core bolt is smaller than an outer diameter of the base bolt, so that in a state where the core bolt is fastened to the base bolt, the nut is fastened to the base bolt.

6. The bolt structure according to claim 1, wherein the base bolt comprises a plurality of extended induction paths that are arranged at an angle relative to the longitudinal direction, and the locking units have a plurality of pins inserted into the plurality of extended induction paths so that the locking units are pushed by a movement of the core bolt and protrude outwardly from the base bolt to apply pressurizing forces to the nut.

7. The bolt structure according to claim 1, wherein the counter locking member comprises:
   a protruding member protruding from one end portion thereof in such a manner as to come into contact with the end portion of the core bolt and to be inserted into a driver groove formed on the end portion of the core bolt; and
   a polygonal member having a polygonal longitudinal section formed on an other end portion thereof in such a manner as to be inserted into a polygonal through hole formed on a center of the flange.

8. The bolt structure according to claim 7, wherein the polygonal member comprises a fastening hole formed at a center thereof, the fastening hole having a screw thread formed along an inner peripheral surface thereof, and the flange is fastened to the base bolt by means of a fastening tool, the fastening tool comprising: a fastening protrusion having a screw thread formed on an outer peripheral surface thereof in such a manner as to be fastened to the fastening hole of the polygonal member; and an accommodation member slidingly movable and having an accommodation hole formed therein to accommodate the polygonal member thereinto.

* * * * *